US012601397B2

(12) United States Patent (10) Patent No.: US 12,601,397 B2
Wuerr et al. (45) Date of Patent: Apr. 14, 2026

(54) ASYMMETRIC TORQUE BRACKETS

(71) Applicants:ZF Friedrichshafen AG, Friedrichshafen (DE); ZF Wind Power Antwerpen N.V., Lommel (BE)

(72) Inventors: Michael Wuerr, Hafenlohr-Windheim (DE); Frederik Vanhollebeke, Friedrichshafen (DE); Tom Van der Kamp, Friedrichshafen (DE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 92 days.

(21) Appl. No.: 17/291,284

(22) PCT Filed: Oct. 7, 2019

(86) PCT No.: PCT/EP2019/077022
§ 371 (c)(1),
(2) Date: May 5, 2021

(87) PCT Pub. No.: WO2020/094309
PCT Pub. Date: May 14, 2020

(65) Prior Publication Data
US 2022/0003304 A1 Jan. 6, 2022

(30) Foreign Application Priority Data

Nov. 7, 2018 (DE) ..................... 10 2018 218 936.6

(51) Int. Cl.
*F16H 57/025* (2012.01)
*F03D 15/00* (2016.01)
(Continued)

(52) U.S. Cl.
CPC ........... *F16H 57/025* (2013.01); *F03D 15/00* (2016.05); *F16H 57/0006* (2013.01); *F05B 2260/964* (2013.01); *F16H 2057/02078* (2013.01)

(58) Field of Classification Search
CPC .... F03D 15/00; F03D 80/88; F05B 2260/964; F16H 57/0006; F16H 57/025;
(Continued)

(56) References Cited

U.S. PATENT DOCUMENTS 1,803,895 A 5/1931 Curtiss
3,584,918 A * 6/1971 Gaglione .................. E21B 7/00
74/606 R
(Continued)

FOREIGN PATENT DOCUMENTS

BE 1017836 A3 8/2009
CN 101457735 A * 6/2009 ............. F03D 15/00
(Continued)

OTHER PUBLICATIONS

Hagglunds. (2006). Installation and Maintenance Manual Marathon. Mellansel, Sweden: Author. (Year: 2006).*
(Continued)

*Primary Examiner* — Joseph Brown
(74) *Attorney, Agent, or Firm* — LEYDIG, VOIT & MAYER, LTD.

(57) ABSTRACT

A transmission for a wind turbine includes a first torque bracket and a second torque bracket. The first torque bracket and the second torque bracket are asymmetrical to each other. The torque brackets may include a support arm and a fastening member. The fastening member can be fixed to a machine carrier.

10 Claims, 1 Drawing Sheet

(51) Int. Cl.
    *F16H 57/00*       (2012.01)
    *F16H 57/02*       (2012.01)

(58) Field of Classification Search
    CPC .......... F16H 2057/02078; F16H 57/028; F16F
                                15/00; F01D 25/28
    See application file for complete search history.

(56)              References Cited

U.S. PATENT DOCUMENTS

| | | | | |
|---|---|---|---|---|
| 4,679,464 A * | 7/1987 | Castellani | ............ | F16F 15/027 |
| | | | | 475/159 |
| 4,759,262 A * | 7/1988 | Hay, II | .................... | F16M 1/02 |
| | | | | 248/901 |
| 5,373,923 A * | 12/1994 | Koenig | .................... | F16M 7/00 |
| | | | | 241/101.2 |
| 2012/0076652 A1* | 3/2012 | Ventzke | .................. | F03D 15/00 |
| | | | | 416/61 |
| 2013/0165288 A1 | 6/2013 | Dinter et al. | | |
| 2013/0172141 A1 | 7/2013 | Dinter et al. | | |
| 2015/0069762 A1* | 3/2015 | Mashtare | ............. | F16H 57/025 |
| | | | | 416/61 |
| 2016/0305532 A1* | 10/2016 | Ohl, Jr. | ................. | F16H 57/025 |
| 2017/0152932 A1* | 6/2017 | Diaz Berrade | ......... | F03D 80/00 |
| 2017/0261402 A1* | 9/2017 | Christensen | .......... | G01M 13/04 |
| 2018/0003074 A1* | 1/2018 | Christiansen | ......... | F01D 21/003 |
| 2019/0277393 A1* | 9/2019 | Hasan | .................... | F03D 80/50 |

FOREIGN PATENT DOCUMENTS

| | | | | | | |
|---|---|---|---|---|---|---|
| CN | 102418675 A | * | 4/2012 | ............ | F03D 15/00 |
| CN | 202274041 U | * | 6/2012 | | |
| CN | 103206347 B | * | 6/2015 | | |
| CN | 205096900 U | * | 3/2016 | | |
| CN | 205823553 U | * | 12/2016 | | |
| CN | 206009743 U | * | 3/2017 | | |
| CN | 207178124 U | * | 4/2018 | | |
| DE | 19825442 A1 | * | 10/1999 | .......... | F16H 57/025 |
| DE | 10219664 A1 | * | 11/2003 | ............ | F03D 17/00 |
| DE | 102010044297 A1 | * | 3/2012 | ............ | F01D 25/28 |
| DE | 102012012140 A1 | * | 12/2013 | ............ | F03D 15/00 |
| DE | 102015220996 A1 | * | 4/2017 | | |
| DE | 102015119173 A1 | * | 5/2017 | .......... | F16H 57/023 |
| DE | 102018219012 A1 | * | 5/2020 | | |
| EP | 0992710 A2 | * | 4/2000 | | |
| EP | 1065374 A2 | * | 1/2001 | ............ | F03D 80/70 |
| EP | 1197677 A2 | * | 4/2002 | ............ | F03D 80/70 |
| EP | 2221475 A2 | * | 8/2010 | ............ | F03D 13/10 |
| EP | 2541058 A1 | | 1/2013 | | |
| EP | 2541096 A1 | | 1/2013 | | |
| EP | 3121443 A1 | * | 1/2017 | ............ | F03D 15/00 |
| JP | 2001349375 A | | 12/2001 | | |
| JP | 2016102445 A | * | 6/2016 | ............ | F03D 80/82 |
| KR | 20120101812 A | * | 9/2012 | | |
| WO | WO 2017045688 A1 | | 3/2017 | | |

OTHER PUBLICATIONS

EP 1197677 A2 (Franz Mitsch) Apr. 17, 2002 (full text) [online] [retrieved on Apr. 6, 2023]. Retrieved from Clarivate Analytics. (Year: 2002).*

Riddle, S. (Mar. 25, 2016). Machinery vibration problems and solutions. Acoem USA. https://acoem.us/blog/other-topics/machinery-vibration-problems-solutions-part-6-resonance/ (Year: 2016).*

\* cited by examiner

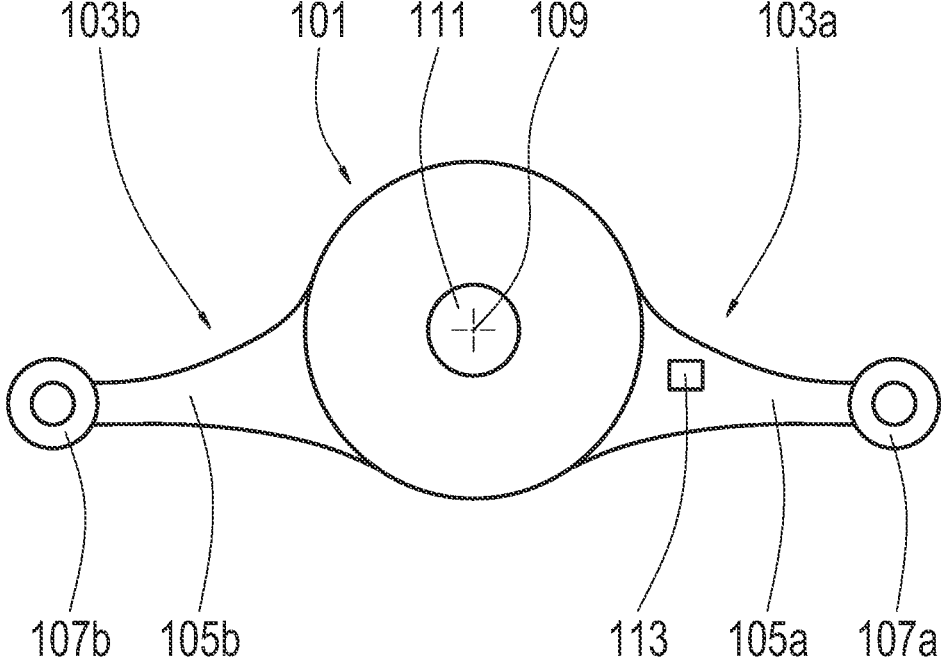

ASYMMETRIC TORQUE BRACKETS

CROSS-REFERENCE TO PRIOR APPLICATIONS

This application is a U.S. National Phase Application under 35 U.S.C. § 371 of International Application No. PCT/EP2019/077022, filed on Oct. 7, 2019, and claims benefit to German Patent Application No. DE 10 2018 218 936.6, filed on Nov. 7, 2018. The International Application was published in German on May 14, 2020 as WO 2020/094309 under PCT Article 21(2).

FIELD

The disclosure relates to a transmission for a wind turbine having a first torque bracket and a second torque bracket.

BACKGROUND

In the case of transmissions for wind turbines, the so-called "torque arm flapping" is increasingly proving to be a problem that endangers the certification of the plant. "Torque arm flapping" refers to a natural vibration of the torque brackets of the transmission in the axial direction.

SUMMARY

In an embodiment, the present invention provides a transmission for a wind turbine. The transmission includes a first torque bracket and a second torque bracket. The first torque bracket and the second torque bracket are asymmetrical to each other.

BRIEF DESCRIPTION OF DRAWINGS

Embodiments of the present invention will be described in even greater detail below based on the exemplary FIGURES. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

The FIGURE provides a front view of a wind turbine transmission.

DETAILED DESCRIPTION

The present disclosure relates to a transmission for wind turbines in which the vibration behavior is improved. In particular, the natural vibrations of the torque brackets of the transmission in the axial direction are to be mitigated.

The transmission has a first torque bracket and a second torque bracket. Preferably, the first torque bracket and the second torque bracket are made of the same material.

A torque bracket is a mechanical structure for supporting an input torque of the transmission in a machine carrier of the wind turbine. The torque bracket has a support arm and a fastening member. The fastening member is configured to be fixed in the machine carrier. Usually it is designed as an eye, into which a bolt is inserted for fastening in the machine carrier. The support arm connects the fastening member to a housing of the transmission and serves to transmit forces between the housing and the fastening member. In particular, the support arm transmits forces resulting from the input torque.

The transmission preferably has exactly two torque brackets. In this case, no further torque bracket exists in addition to the first torque bracket and the second torque bracket.

The first torque bracket and the second torque bracket are asymmetrical. This means that there is no symmetry relationship between the first torque bracket and the second torque bracket. The first torque bracket and the second torque bracket are neither point-symmetric, axis-symmetric nor mirror-symmetric. In particular, the first torque bracket and the second torque bracket are not mirror-symmetrical to any longitudinal sectional plane, i.e., a plane fully containing the axis of rotation of an input shaft of the transmission.

The asymmetry relates to the shape of the first torque bracket and the second torque bracket. The asymmetric shape implies an asymmetric distribution of the stiffness and masses of the first torque bracket and the second torque bracket. This results in different resonant frequencies. This causes a change in the resonance behavior with a broader but smaller peak in the frequency spectrum. The phenomenon of torque arm flapping mentioned at the beginning can thus be mitigated.

In a preferred further embodiment, the first torque bracket and the second torque bracket are each made in one piece. If the first torque bracket and the second torque bracket are castings, corresponding castings are asymmetrical to each other.

In an alternatively preferred further embodiment, the first torque bracket has a weight fixed to the first torque bracket. This implies that the weight and the rest of the first torque bracket are embodied in two pieces, i.e., separate parts that are not integrally connected to each other. In particular, the weight can be fixed to the support arm or fastening member of the first torque bracket. It is advantageous if the weight is placed radially as far outside as possible.

The term weight is used here for any component whose mass is used to achieve the effect according to the invention.

The second torque bracket preferably consists of a support arm and a fastening member. In particular, this means that the second torque bracket has no weight. Preferably, the support arm and the fastening member of the second torque bracket are integrally connected.

In a preferred further embodiment, the second torque bracket is symmetrical to an arrangement consisting of the support arm and the fastening member of the first torque bracket. This arrangement is preferably designed as a single piece, i.e. the support arm and the fastening member of the first torque bracket are joined together as a single piece.

The transmission 101 shown in FIG. 1 has a transmission housing forming a first torque bracket 103a and a second torque bracket 103b. The two torque brackets 103a, 103b each have a support arm 105a, 105b and a fastening eye 107a, 107b. The support arms 105a, 105b extend between the gear housing and the respective fastening eye 107a, 107b. The support arms 105a, 105b are integrally connected to the respective fastening eye 107a, 107b. Similarly, the support arms 105a, 105b are integrally connected to the transmission housing.

An arrangement consisting of the first fastening eye 107a and the support arm 105a of the first torque bracket 103a is mirror-symmetrical to an arrangement consisting of the fastening eye 107b and the support arm 105b of the second torque bracket 103b with respect to a longitudinal sectional plane extending perpendicularly through an axis of rotation 109 of an input shaft 111 of the transmission 101. However, the first torque bracket 103a comprises a weight 113. Therefore, the first torque bracket 103a and second torque bracket 103b are asymmetrical. The weight 113 serves to mitigate the vibration behavior of the two torque brackets 103a, 103b.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

101 Transmission
103a first torque bracket
103b second torque bracket
105a Support arm of the first torque bracket
105b Support arm of the second torque bracket
107a Fastening eye of the first torque bracket
107b Fastening eye of the second torque bracket
109 Axis of rotation
111 Input shaft
113 Weight

The invention claimed is:

1. A transmission for a wind turbine, comprising:
a housing forming a first torque bracket and a second torque bracket,
wherein the first torque bracket and the second torque bracket are asymmetrical in shape, stiffness distribution, and mass distribution relative to each other;
an input shaft; and
a vibration control weight fixed to a support arm of the first torque bracket,
wherein the second torque bracket does not have a vibration control weight fixed to it,
wherein the vibration control weight is configured to mitigate vibration of the first torque bracket induced by rotation of the input shaft, wherein the input shaft is configured to rotate about an axis of rotation,
wherein the first torque bracket and the second torque bracket are integrally connected to the transmission housing,
wherein the transmission housing surrounds the input shaft about the axis of rotation, and
wherein the first torque bracket and the second torque bracket each include a fastening eye, the fastening eye of the first torque bracket being arranged at an end of the first torque bracket opposite the axis of rotation and the fastening eye of the second torque bracket being arranged at an end of the second torque bracket opposite the axis of rotation.

2. The transmission according to claim 1, wherein the first torque bracket and the second torque bracket are each made in one piece.

3. The transmission according to claim 1, wherein the first torque bracket and the second torque bracket are configured to have different resonant frequencies.

4. The transmission according to claim 1, wherein the fastening eyes of the first and second torque brackets are arranged at opposing lateral ends of the transmission and each receive a bolt for fastening the transmission in the wind turbine.

5. The transmission according to claim 4, wherein the fastening eyes are arranged such that the bolt received by each fastening eye extends parallel to the axis of rotation.

6. The transmission according to claim 5, wherein the vibration control weight is fixed to the support arm of the first torque bracket between the input shaft and the fastening eye of the first torque bracket.

7. The transmission according to claim 1, wherein the vibration control weight is configured to alter a resonance behavior of the transmission to have a broader and smaller peak in a frequency spectrum.

8. The transmission according to claim 1, wherein the vibration control weight is configured to mitigate vibration of the first torque bracket in an axial direction.

9. A transmission for a wind turbine, comprising:
a housing forming a first torque bracket and a second torque bracket,
an input shaft configured to rotate about an axis of rotation; and
a vibration control weight fixed to a support arm of the first torque bracket,
wherein the second torque bracket does not have a vibration control weight fixed to it,
wherein the first torque bracket and the second torque bracket are integrally connected to the transmission housing,
wherein the transmission housing surrounds the input shaft about the axis of rotation, and
wherein a profile of the first torque bracket that extends orthogonal to the axis of rotation is symmetrical in shape to a profile of the second torque bracket that extends orthogonal to the axis of rotation.

10. The transmission according to claim 9, wherein the vibration control weight is configured to alter a resonance behavior of the transmission to have a broader and smaller peak in a frequency spectrum.

* * * * *